United States Patent [19]
Buxel et al.

[11] Patent Number: 4,537,571
[45] Date of Patent: Aug. 27, 1985

[54] PROCESS OF AND APPARATUS FOR REHEATING AND CONVEYING A GRANULAR HEAT CARRIER

[75] Inventors: Ludwig M. Buxel, Waltrop; Ludwig Mülhaus, Iserlohn, both of Fed. Rep. of Germany

[73] Assignee: Uhde GmbH, Dortmund, Fed. Rep. of Germany

[21] Appl. No.: 524,090

[22] Filed: Aug. 17, 1983

[30] Foreign Application Priority Data

Aug. 18, 1982 [DE] Fed. Rep. of Germany ....... 3230656

[51] Int. Cl.³ .......................... F27B 15/00; F28C 3/10
[52] U.S. Cl. ...................................... 432/27; 432/197; 432/215
[58] Field of Search .......................... 432/27, 197, 215; 55/208, 262, 390

[56] References Cited
U.S. PATENT DOCUMENTS 3,585,023  6/1971  Vlnaty et al. ...................... 432/197
4,153,411  5/1979  Isheim .................................. 432/27
4,259,094  3/1981  Nagai et al. ............................ 55/390

Primary Examiner—John J. Camby
Attorney, Agent, or Firm—Toren, McGeady, Stanger, Goldberg & Kiel

[57] ABSTRACT

In reheating and conveying a granular heat carrier, such as sand, using a carrier gas, where the heat carrier may be utilized for desorption by heating a charged lumpy adsorbent, the heat carrier is circulated through a vertically arranged cycle loop. Initially the heat carrier is conveyed from a carrier gas inlet at the lowermost part of the loop to a separator at the uppermost point. After separation, the heat carrier flows downwardly under the effect of gravity through the loop passing, in turn, through a heater, a desorber where it is mixed with the adsorbent, and another separator where it is separated from the adsorbent, before the carrier returns to the carrier gas inlet for repeating the cycle. If sand is used as the heat carrier it can be conveyed upwardly through the loop by compressed air.

22 Claims, 5 Drawing Figures

PROCESS OF AND APPARATUS FOR REHEATING AND CONVEYING A GRANULAR HEAT CARRIER

SUMMARY OF THE INVENTION

The present invention is directed to a process of and apparatus for reheating and conveying a granular heat carrier, such as sand, conveyable by a gas, and preferably used for desorption by heating a charged lumpy adsorbent, such as activated carbon pellets.

In "Chem. Ind. XXVII/August 1975, pps. 457–461" Knoblauch describes among other things the experience gained concerning flue gas desulphurization. In the flue desulphurization process described with desorption of charged activated coke—such activated coke being brought into contact with sand of about 750° C. in a desorber of special design—the sand leaving the desorber is fed to a combustion chamber after being separated from the coke and returned in the reheated state together with the hot flue gases produced to the top for the purpose of re-utilization. This so-called "gas lift" has numerous advantages but also serious disadvantages, mainly involving the fact that very high gas velocities are used causing considerable wear and tear and a very high energy consumption. Moreover, part of the flue gases must be recycled for cooling the gas lift masonry. This high-temperature-resistant masonry, in turn, requires a considerable investment.

Therefore, the primary object of the present invention is to provide a solution which avoids the above-mentioned disadvantages and allows, in particular, lower carrier gas velocities and temperatures.

In accordance with the present invention, a process is provided in which the heat carrier is conveyed by carrier air into a separator so that the separated heat carrier is fed by gravity through a heater, a desorber, and another separator for separating the heated carrier from the adsorbent, and then returning the separated heat carrier to the carrier gas inlet into the cycle loop or conveying system.

In accordance with the present invention, the heat carrier may be conveyed at a temperature corresponding, at most, to the temperature of the heat carrier as it leaves the desorber, while the carrier air may be at a much lower temperature. As a result, other types of masonry as well as much lower carrier air velocities can be utilized. The arrangement of the process loop provides a temperature gradient due to which the heat carrier can be recycled by mechanical means or by any combination of mechanical and pneumatic means.

In one embodiment of the invention, at least part of the carrier air, after separation, is directed into the heater. Thus the heat transferred from the heat carrier to the carrier air is not lost via a stack, but remains within the process.

Still another embodiment of the invention provides that the carrier air is preheated in a heat exchanger by means of the heater flue gas and/or part of the air fed to the heater is introduced via a heat carrier cooler arranged downstream of the device for separating the heat carrier from the adsorbent. These process alternatives allow for further heat recovery.

Yet another embodiment of the present invention provides that in the case of gas desulphurization by means of activated coke, the fines resulting from abrasion are recovered for heat generation in the heater so that fuel requirements are reduced. Furthermore, both continuous and discontinuous operation are feasible according to the invention.

The apparatus used in carrying out the above-described process allows the sand being conveyed in a vertical pneumatic conveyor to be carried to the highest point of the cycle loop where it passes through a separator with the sand flowing downwardly, under the effect of gravity, to a sand heater, then through a desorber, and finally through a device for separating the sand from the adsorbent introduced into the desorber from where the sand is returned to the inlet of the cycle loop or conveying system.

The embodiments of the present invention are applicable to the apparatus used either alone or in combination. Accordingly, the separator for the sand and the carrier air may be designed a cyclone or as a settling chamber and/or the heater for the sand may be designed as a rotary kiln, as a traveling bed with an upstream combustion chamber, or as a fluidized bed furnace. In addition, the desorber and the device for separating sand from the adsorbent can be designed as a common device, preferably as a vibrating conveyor. An air-cooled sand cooler can be arranged downstream of the device separating the sand from the adsorbent with the effluent air being preheated for use as combustion air.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
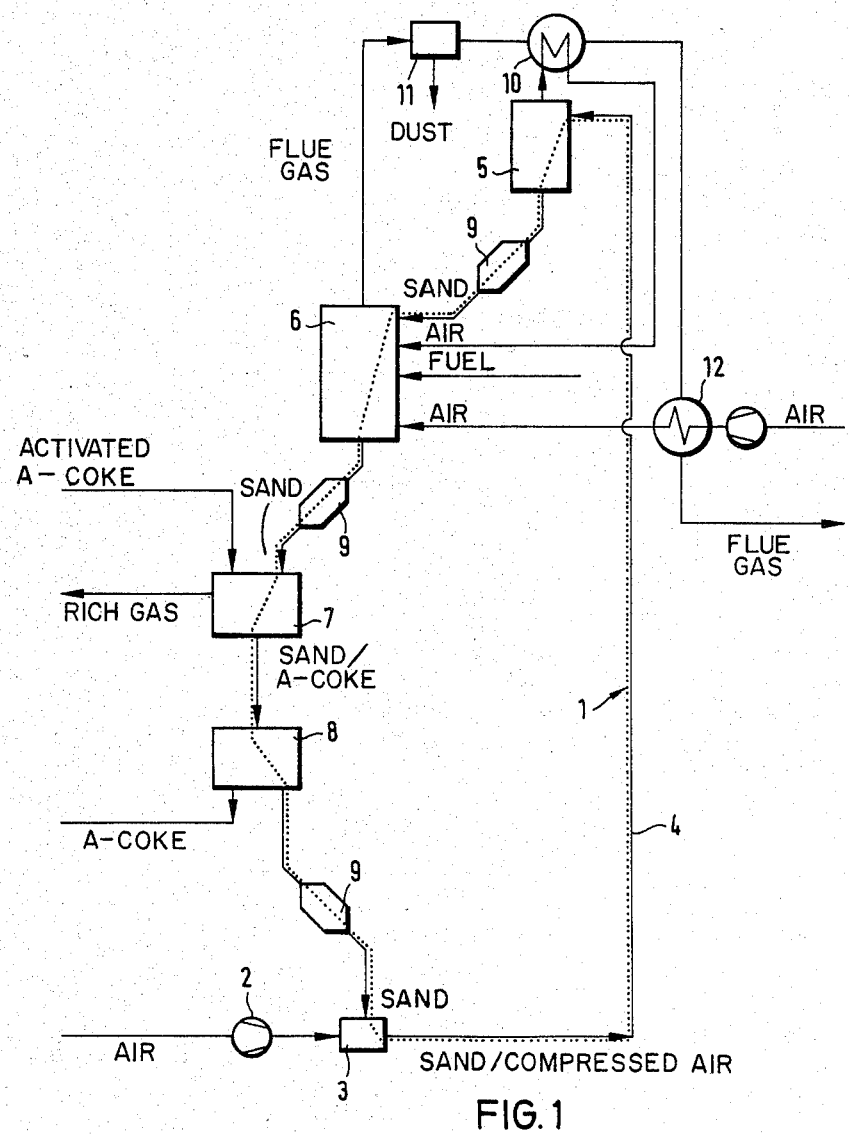
FIG. 1 is a schematic showing of the apparatus used in one embodiment of the present invention for flue gas desulpherization by means of activated coke.
Figure 2:
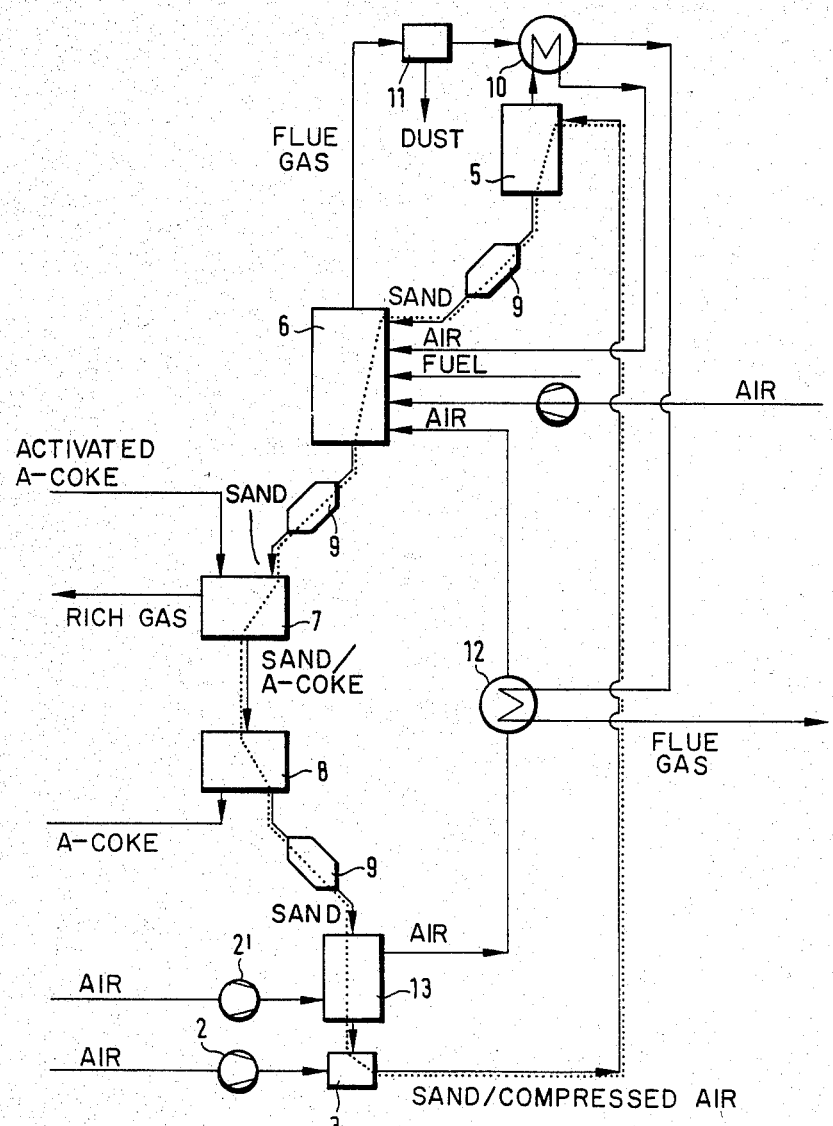
FIG. 2 is a schematic showing of a modified design of the present invention.

In the cycle loop 1 shown in FIGS. 1 and 2, the flow of sand through the loop is indicated by a continuous dotted line. As viewed, the cycle loop 1 is arranged vertically and at the lowermost point in the loop an inlet 3 for the conveying system 4 supplies compressed air from a compressor 2. The sand after completing a cycle within the loop 1 is conveyed by the compressed air flowing through the inlet 3 in the upward direction through the loop. At the uppermost end of the loop the combined sand-heat carrier and compressed air-carrier gas is directed into a separator 5 where the sand and carrier air are separated. The separated sand flows downwardly from the separator 5 under the effect of gravity into a heater 6. After being heated within the heater 6, the sand is again conveyed downwardly by gravity to a desorber 7 and from the desorber to a device 8 for separating the sand from the adsorbent mixed with the sand within the desorber 7. Coke may be used as the adsorbent. After the sand is separated in the device 8 it is returned to the inlet 3 for repeating its cycle flow through the loop 1 of the conveying system 4. The sand receivers 9 illustrated in the drawing prevent pressure compensation between the individual process stages.

As illustrated in FIG. 1, all of the parts of the apparatus located between the uppermost point and the lowermost point in the cycle loop 1 are arranged so that the heat carrier or sand flows downwardly by gravity.

The compressed air divided out in the separator 5 is conveyed through a flue gas-heated heat exchanger 10 into the heater 6. The flue gases from the heater 6 pass through a dust separator 11, then through the heat exchanger 10, and, if necessary, through a further heat exchanger 12 before being carried off through a stack not shown in the drawing.

The addition of the adsorbent into and the withdrawal of the rich gas from the desorber 7 have been shown for completeness only.

EXAMPLE 15,000 kg of charged activated coke leaving a flue gas desulphurization plant at a temperature of 90° C. are mixed in the desorber with 169,000 kg of sand at a temperature of 711° C. Due to the heating of the activated coke, 3,400 kg rich gas at 450° C. are released. The activated coke/sand mixture leaving the desorber is divided in the separator into 11,600 kg active coke and 169,000 kg of sand each at 650° C. While the activated coke is returned to the desorber, the sand is fed through a cyclone separator to the heater by means of 37,700 kg of carrier air at 50° C. and 500 mbar. The air separated out in the cyclone is the combustion air for firing 638 kg of fuel oil required for heating the sand in the heater.

In FIG. 2 another embodiment of the present invention is illustrated with the device 8 for separating the sand from the adsorbent equipped with a downstream sand cooler 13 into which compressed air flows from a compressor 21. The heated air exiting from the cooler 13, after it has cooled the sand, flows upwardly through a heat exchanger 12 into the heater 6. The other features of the embodiment, as shown in FIG. 2, correspond to the features shown in FIG. 1 so that a further description of the device is not necessary.

Figure 3:
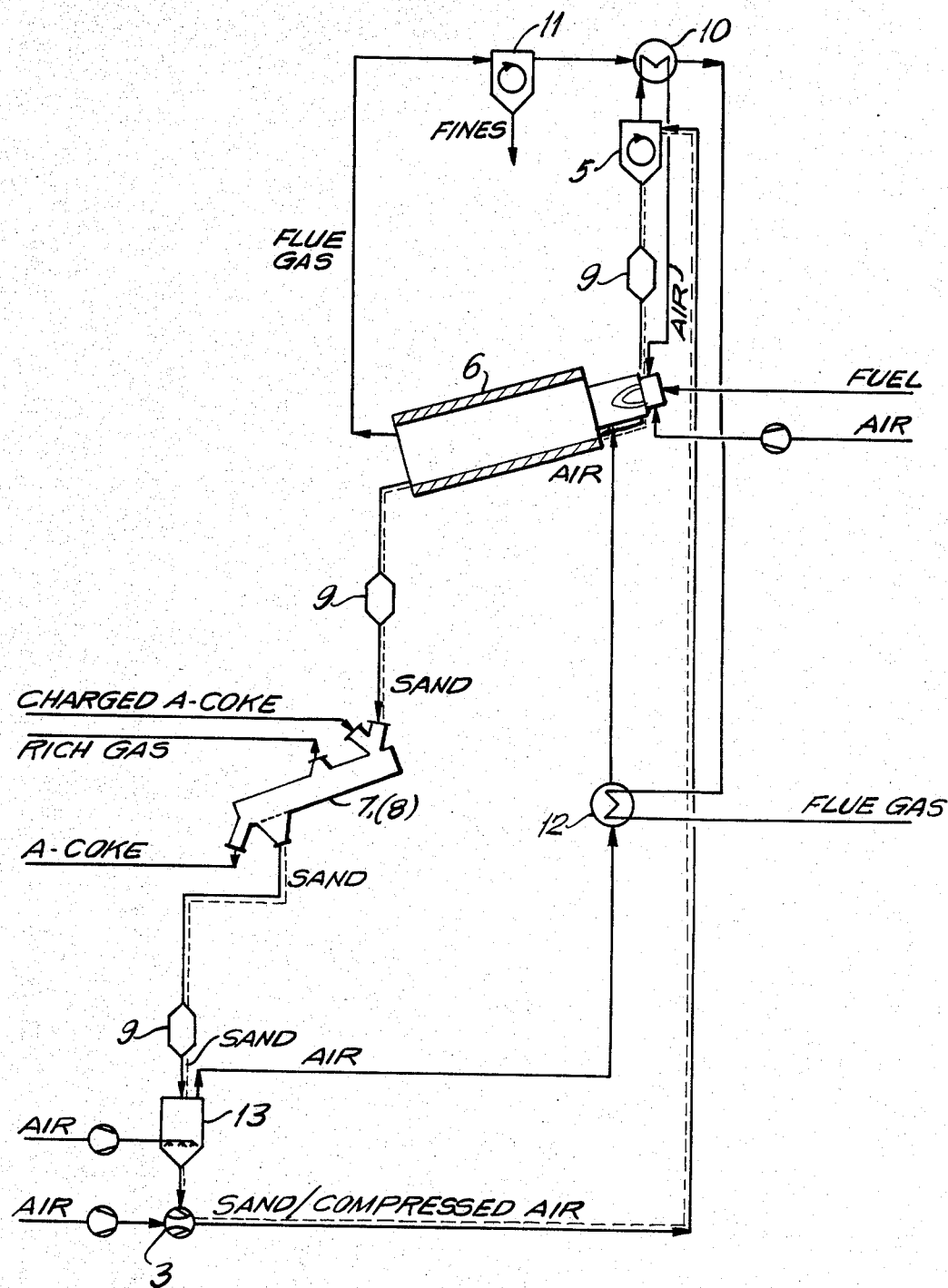
FIG. 3 is a schematic showing of another embodiment of the present invention.

FIG. 3 shown the heater 6 as a rotary kiln, and the separator 5 as a cyclone separator.

Figure 4:
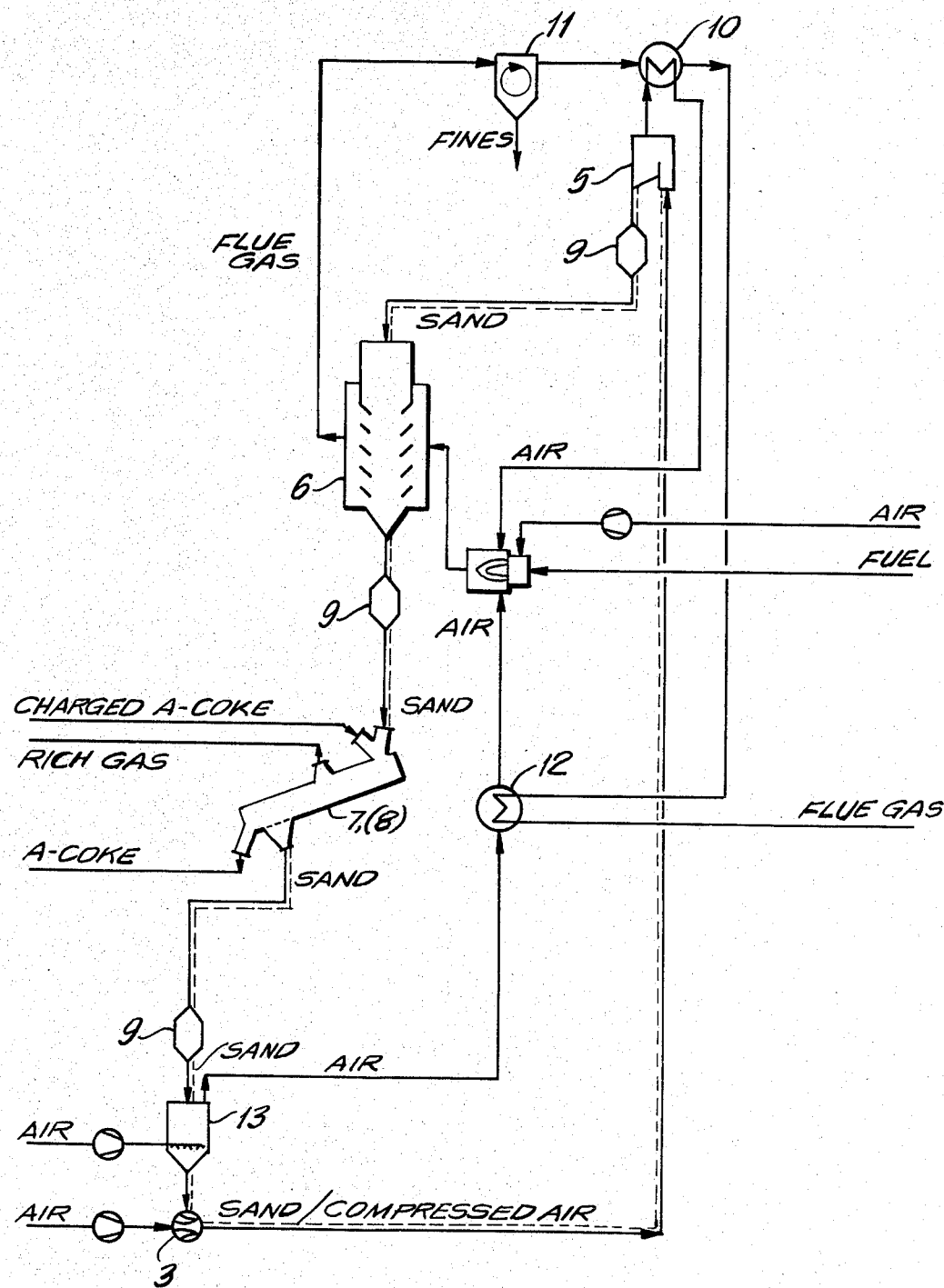
FIG. 4 is a schematic showing of still another embodiment of the present invention.

FIG. 4 shows the heater 6 as a traveling bed with an upstream combustion chamber. The separator 5 is illustrated as a settling chamber.

Figure 5:
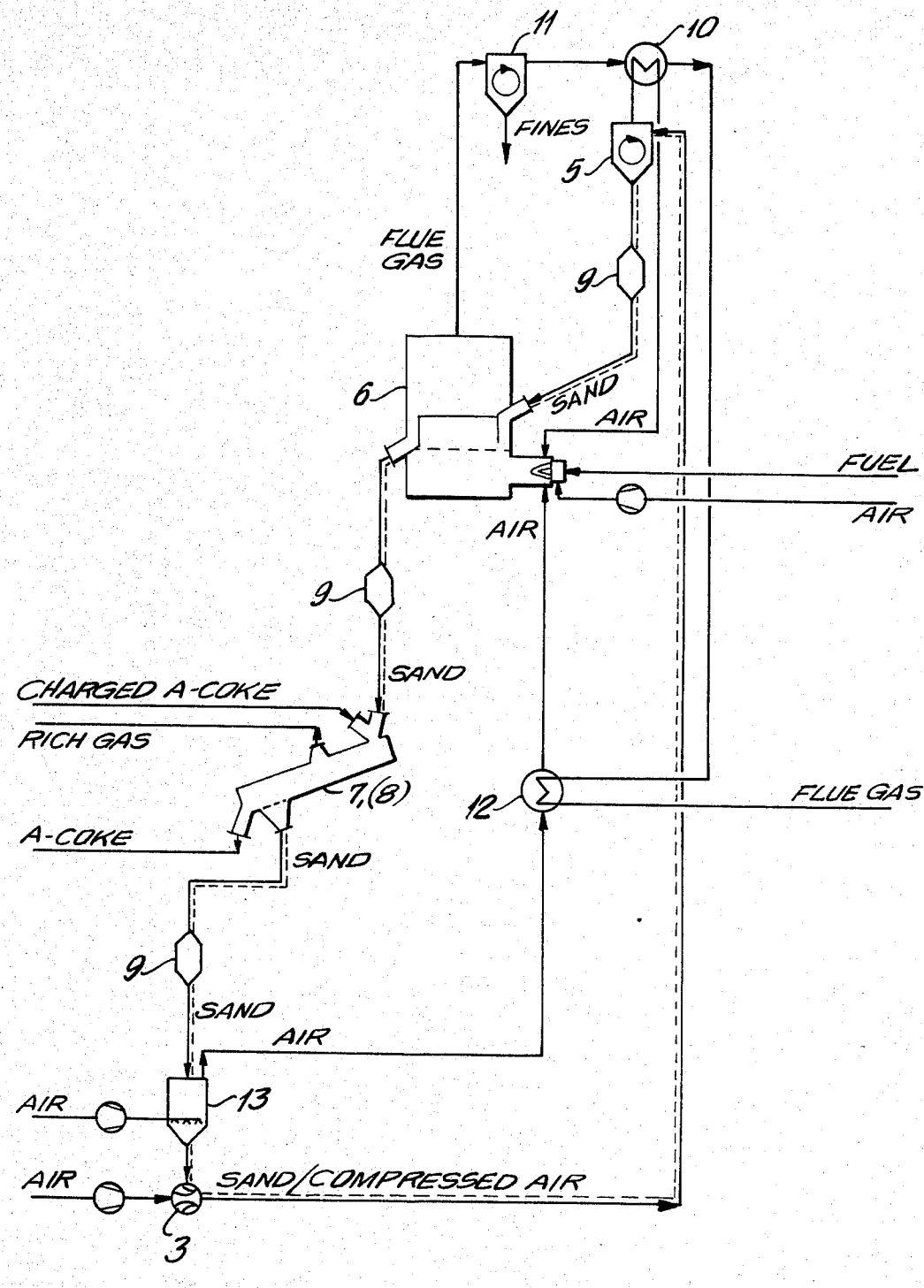
FIG. 5 is a schematic showing of yet another embodiment of the present invention.

FIG. 5 displays the heater 6 as a fluidized bed furnace. In FIG. 5 as in FIGS. 3 and 4, the desorber 7 and the separating device 8 are combined as a common member. The common member is a vibrating conveyor.

The embodiments of the present invention as described above, may be varied in many ways without departing from the fundamental concept of the present invention. Accordingly, the invention is not limited to any specific heat carrier. The same is true for the carrier air, since any other suitable gas may be used. Further, the conveying system may be modified by using mechanical conveyors which could be air-cooled for recovering hot combustion air required by the heater.

While specific embodiments of the invention have been shown and described in detail to illustrate the application of the inventive principles, it will be understood that the invention may be embodied otherwise without departing from such principles.

We claim:

1. Process of reheating and conveying a granular heat carrier, such as sand, using a gas where the heat carrier may be employed for desorption by heating a charged lumpy adsorbent, such as activated carbon pellets, comprising a vertically arranged cycle loop having a lower end and an upper end with the heat carrier located in the loop, introducing a carrier gas into the lower end of the loop with the carrier gas at a lower temperature than the heat carrier in the lower end of the loop and conveying the heat carrier by the lower temperature carrier gas in the upward direction from the lower end of the loop into a closed space located at the upper end of the loop, separating the heat carrier from the carrier gas in the closed space, flowing the separated heat carrier under the effect of gravity downwardly in the loop and during the gravity feed, in turn, heating the heat carrier, mixing the heated heat carrier and the adsorbent in a desorber, separating the heat carrier from the adsorbent and returning the heat carrier to the point at the lower end of the loop where the carrier gas is introduced for conveying the heat carrier.

2. Process, as set forth in claim 1, including conveying the carrier gas removed from the closed space after separating the carrier gas from the heat carrier and directing the separated carrier gas into the cycle loop at the location where the separated heat carrier is heated.

3. Process, as set forth in claim 2, including the step of heating the separated carrier air outside of the cycle loop using the flue gas from the heater location before passing the carrier gas into the heater location.

4. Process, as set forth in claim 1, including the step of passing a part of the carrier gas in heat transfer relation with the heat carrier at a location downstream from the location where the heat carrier is separated from the adsorbent and conveying the heated carrier gas to the location of heating the separated heat carrier.

5. Process, as set forth in claim 1, including using activated coke as the adsorbent and collecting the fines resulting from the abrasion of the activated coke in the desorber and using the collected fines for heating the heat carrier.

6. Process, as set forth in claim 1, including circulating the heat carrier in a continuous operation through the cycle loop.

7. Process, as set forth in claim 1, including the step of circulating the heat carrier in a discontinuous operation through the cycle loop.

8. Process, as set forth in claim 1, including using compressed air as the carrier gas.

9. Apparatus for reheating and conveying a granular heat carrier, such as sand, using a carrier gas where the heat carrier may be employed for desorption by heating a charged lumpy adsorbent, comprising means for forming a vertically extending cycle loop having a lower end and an upper end with an inlet for introducing the carrier gas into the lower end of the cycle loop for conveying the heat carrier, a first separator located in the uppermost part of the upper end of said cycle loop for receiving the heat carrier and carrier gas and separating the heat carrier and carrier gas, a heater located in said cycle loop below and downstream from said first separator so that the separated heat carrier flows by gravity from said separator to said heater, a desorber located in said cycle loop below and downstream from said heater so that the heated heat carrier flows by gravity into said desorber, said desorber arranged to receive the adsorbent, a second separator located in said cycle loop downwardly from and downstream of said desorber for receiving the heat carrier and adsorbent from said desorber and for separating the heat carrier and adsorbent, and said second separator having an outlet for returning the separated heat carrier to the lower end of said cycle loop for flow to said inlet of said cycle loop for another cycle therethrough.

10. Apparatus, as set forth in claim 9, wherein said first separator is a cyclone separator.

11. Apparatus, as set forth in claim 9, wherein said first separator is a settling chamber.

12. Apparatus, as set forth in claim 9, wherein said heater is a rotary kiln.

13. Apparatus, as set forth in claim 9, wherein said heater comprises a traveling bed with an upstream combustion chamber.

14. Apparatus, as set forth in claim 9, wherein said heater is a fluidized bed furnace.

15. Apparatus, as set forth in claim 9, wherein said desorber and said second separator are combined as a common member.

16. Apparatus, as set forth in claim 15, wherein said common member is a vibrating conveyor.

17. Apparatus, as set forth in claim 9, wherein a heat carrier cooler is located in said cycle loop downstream from said second separator and means for supplying carrier gas into said cooler and for moving carrier gas from said cooler for introduction into said heater.

18. Process of reheating and conveying a granular heat carrier, such as sand, using a gas where the heat carrier may be employed for desorption by heating a charged lumpy adsorbent, such as activated carbon pellets, comprising a vertically arranged cycle loop, conveying the heat carrier by a carrier gas in the upward direction through the cycle loop into a closed space, separating the heat carrier from the carrier gas in the closed space, flowing the separated heat carrier under the effect of gravity downwardly in the cycle loop and during the gravity feed, in turn, heating the heat carrier, mixing the heated heat carrier and the adsorbent in a desorber, separating the heat carrier from the adsorbent and returning the heat carrier to the point where the carrier gas is introduced for conveying the heat carrier, and conveying the carrier gas removed from the closed space after separating the carrier gas from the heat carrier and directing the separated carrier gas into the cycle loop at the location where the separated heat carrier is heated.

19. Process, as set forth in claim 18, including the step of heating the separated carrier air outside of the cycle loop using the flue gas from the heater location before passing the carrier gas into the heater location.

20. Process of reheating and conveying a granular heat carrier, such as sand, using a gas where the heat carrier may be employed for desorption by heating a charged lumpy adsorbent, such as activated carbon pellets, comprising a vertically arranged cycle loop, conveying the heat carrier by a carrier gas in the upward direction through the cycle loop into a closed space, separating the heat carrier from the carrier gas in the closed space, flowing the separated heat carrier under the effect of gravity downwardly in the cycle loop and during the gravity feed, in turn, heating the heat carrier, mixing the heated heat carrier and the adsorbent in a desorber, separating the heat carrier from the absorbent and returning the heat carrier to the point where the carrier gas is introduced for conveying the heat carrier, and passing a part of the carrier gas in heat transfer relation with the heat carrier at a location downstream from the location where the heat carrier is separated from the adsorbent and conveying the heated carrier gas to the location of heating the separated heat carrier.

21. Process of reheating and conveying a granular heat carrier, such as sand, using a gas where the heat carrier may be employed for desorption by heating a charged lumpy adsorbent, such as activated carbon pellets, comprising a vertically arranged cycle loop, conveying the heat carrier by a carrier gas in the upward direction through the loop cycle into a closed space, separating the heat carrier from the carrier gas in the closed space, flowing the separated heat carrier under the effect of gravity downwardly in the cycle loop and during the gravity feed, in turn, heating the heat carrier, mixing the heated heat carrier and the adsorbent in a desorber, separating the heat carrier from the adsorbent and returning the heat carrier to the point where the carrier gas is introduced for conveying the heat carrier, and using activated coke as the adsorbent and collecting the fines resulting from the abrasion of the activated coke in the desorber and using the collected fines for heating the heat carrier.

22. Process of reheating and conveying a granular heat carrier, such as sand, using a gas where the heat carrier may be employed for desorption by heating a charged lump adsorbent, such as activated carbon pellets, comprising a vertically arranged cycle loop, conveying the heat carrier by a carrier gas in the upward direction through the cycle loop into a closed space, separating the heat carrier from the carrier gas in the closed space, flowing the separated heat carrier under the effect of gravity downwardly in the cycle loop and during the gravity feed, in turn, heating the heat carrier, mixing the heated heat carrier and the adsorbent in a desorber, separating the heat carrier from the adsorbent and returning the heat carrier to the point where the carrier gas is introduced for conveying the heat carrier, and circulating the heat carrier in a discontinuous operation through the cycle loop.

* * * * *